United States Patent
Kitchin

(10) Patent No.: US 8,228,790 B2
(45) Date of Patent: *Jul. 24, 2012

(54) PREEMPTIVE DYNAMIC FREQUENCY SELECTION

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 12/364,348

(22) Filed: Feb. 2, 2009

(65) Prior Publication Data

US 2009/0135780 A1    May 28, 2009

Related U.S. Application Data

(63) Continuation of application No. 10/738,851, filed on Dec. 16, 2003, now Pat. No. 7,486,616.

(51) Int. Cl.
*G01R 31/08* (2006.01)
*H04W 4/00* (2009.01)
*H04J 1/00* (2006.01)

(52) U.S. Cl. ......... 370/228; 370/329; 370/333; 370/343

(58) Field of Classification Search .................. None
See application file for complete search history.

(56) References Cited

U.S. PATENT DOCUMENTS

| | | | |
|---|---|---|---|
| 6,327,468 B1 | 12/2001 | van Iersel et al. | |
| 6,741,554 B2 | 5/2004 | D'Amico et al. | |
| 6,985,465 B2 | 1/2006 | Cervello et al. | |
| 7,058,074 B2 | 6/2006 | Ho et al. | |
| 7,110,374 B2 | 9/2006 | Malhotra et al. | |
| 7,120,138 B2 | 10/2006 | Soomro et al. | |
| 7,206,840 B2 | 4/2007 | Choi et al. | |
| 7,486,616 B2 * | 2/2009 | Kitchin | 370/228 |
| 2002/0071449 A1 | 6/2002 | Ho et al. | |
| 2002/0126635 A1 | 9/2002 | Sugiyama et al. | |
| 2002/0188723 A1 | 12/2002 | Choi et al. | |
| 2003/0002456 A1 | 1/2003 | Soomro et al. | |
| 2003/0171116 A1 | 9/2003 | Soomro | |
| 2003/0181211 A1 | 9/2003 | Razavilar et al. | |
| 2004/0151137 A1 | 8/2004 | McFarland et al. | |

(Continued)

FOREIGN PATENT DOCUMENTS

WO    WO-2005064869 A1    7/2005

OTHER PUBLICATIONS

"Chinese Application Serial No. 200480036122.0, Office Action mailed May 11, 2010", (with English translation), 8 pgs.

(Continued)

*Primary Examiner* — Steven H Nguyen
*Assistant Examiner* — Jutai Kao
(74) *Attorney, Agent, or Firm* — Schwegman, Lundberg & Woessner, P.A.

(57) ABSTRACT

Briefly, in accordance with one embodiment of the invention, an access point may preemptively broadcast an alternate channel to switch to, along with an indication of the beacon timing for the alternate channel, prior to any catastrophic interference. The access point may switch to the alternate channel in the event of interference on the original channel without attempting to broadcast the alternate channel during the interference event. A mobile user may then know in advance of the interference event which alternate channel the access point switched to and may switch to the alternate channel.

20 Claims, 3 Drawing Sheets

U.S. PATENT DOCUMENTS

2004/0218522 A1    11/2004    Sundstrom et al.

OTHER PUBLICATIONS

"802.11h tm—IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY)", *IEEE Std. 802.11h tm—2003*, (2003), 75 pgs.

"802.15.3 tm—IEEE Standard for Information Technology—Telecommunications and Information Exchange Between Systems—Local and Metropolitan Networks—Specific Requirements—Part 15:3: Wireless Medium Access Control (MAC) and Physical Layer (PHY) Speci", *IEEE Std. 802.15.3 tm 2003*, (2003), 324 pgs.

"Broadband Radio Access Networks (BRAN): HIPERLAN Type 2; System Overview", *ETSI TR 101 683 V1.1.1 Technical Report*, (2000), 19 pgs.

\* cited by examiner

PREEMPTIVE DYNAMIC FREQUENCY SELECTION

RELATED APPLICATION

This application is a continuation of U.S. application Ser. No. 10/738,851, filed Dec. 16, 2003, now U.S. Pat. No. 7,486,616 which is incorporated by reference herein in its entirety.

BACKGROUND OF THE INVENTION

A wireless local area network (WLAN) system may employ dynamic frequency selection (DFS) to select the best channel on which to operate, typically to avoid an interference event or interferers which may be other WLAN systems or unrelated devices emitting RF energy, or to avoid interfering with other devices such as radars. Such a system may be primarily intended to avoid interfering with other devices, particularly radars, in order to meet regulatory requirements. However, such systems do not perform well in response to a catastrophic interferer. A catastrophic interferer may be defined as one that causes a significant or total reduction in available throughput. A catastrophic interferer may be a non-WLAN device, or a WLAN device using an extremely aggressive channel access mechanism. Such channel access mechanisms may be employed by a centrally controlled WLAN system in which an access point (AP) may assume that it has complete control of the channel and which may not defer its transmissions to other transmitters if it finds the channel busy.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
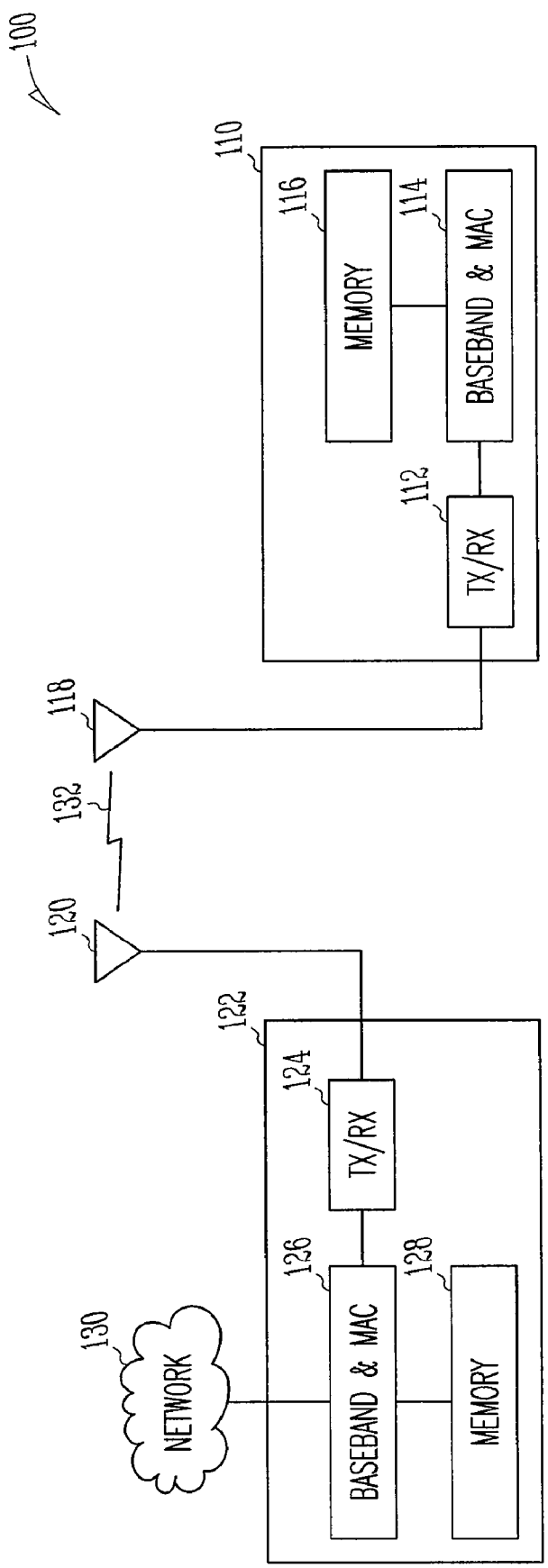
FIG. 1 is a block diagram of a wireless local area network communication system in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device or platform, that manipulate or transform data represented as physical, such as electronic, quantities within the registers or memories of the computing platform into other data similarly represented as physical quantities within the memories, registers or other such information storage, transmission or display devices of the computing platform.

Embodiments of the present invention may include apparatuses for performing the operations herein. This apparatus may be specially constricted for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing platform.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCs), personal computers (PCs), personal digital assistants (PDAs), and the like, although the scope of the invention is not limited in this respect.

Types of wireless communication systems intended to be within the scope of the present invention include, although are not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network communication system in accordance with one embodiment of the present invention will be discussed. In the WLAN communications system 100 shown in FIG. 1, a mobile unit 110 may include a wireless transceiver 112 to couple to at least one antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (IEEE) standard such as IEEE 802.11a, IEEE 802.11b, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Figure 2:
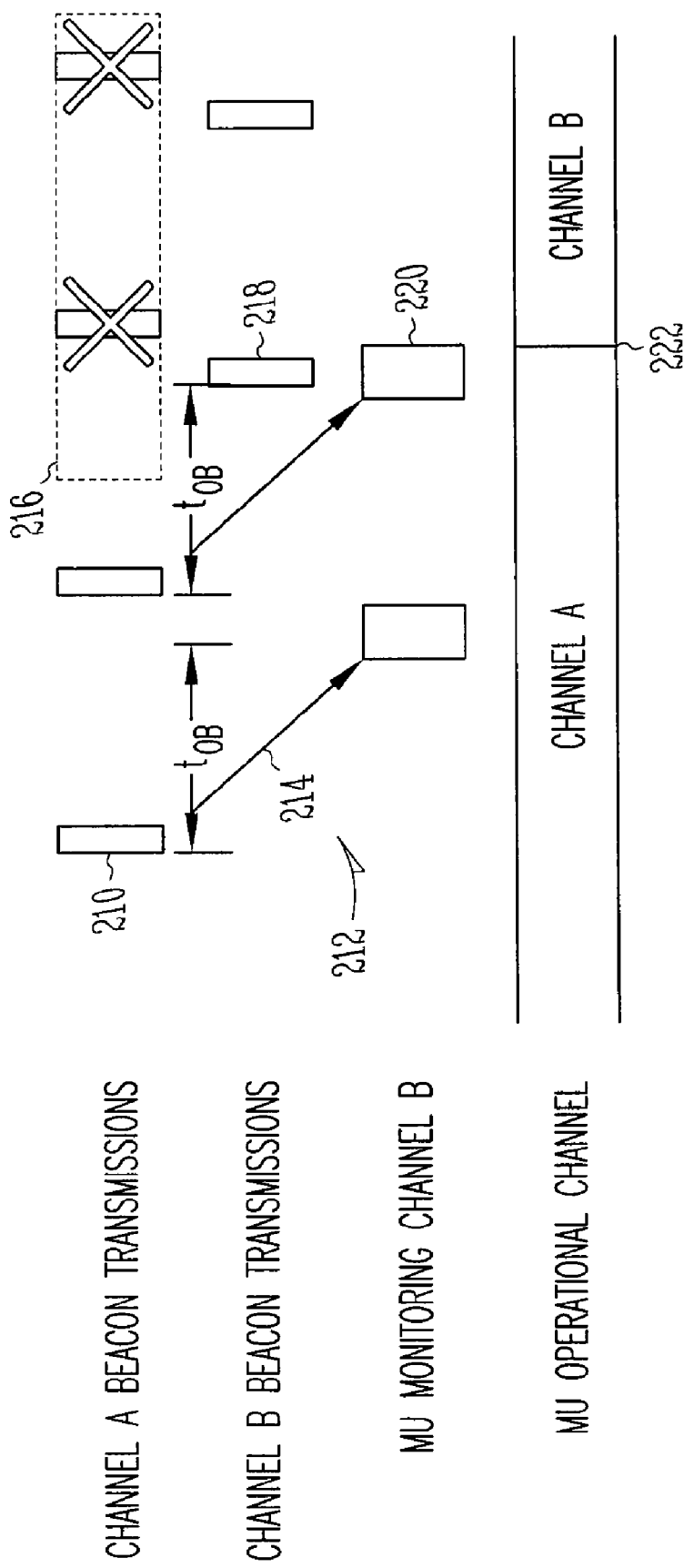
FIG. 2 is a timing diagram of dynamic frequency selection in a wireless LAN system in accordance with one embodiment of the invention.

Referring now to FIG. 2, a timing diagram of dynamic frequency selection in a wireless LAN system in accordance with one embodiment of the invention will be discussed. As shown in FIG. 2, channel A beacon transmissions are shown at 210 and channel B beacon transmissions are shown at 212. While operating on channel A, access point 122 may determine an alternate channel to which it might switch if channel A becomes unsuitable, for example channel B. Access point 122 may transmit the alternate channel, channel B, to mobile unit 110 and an offset time, $t_{oB}$, in beacon transmissions 210 on channel A. Thus, in one embodiment of the invention, access point 122 may preemptively announce to mobile unit 110 a predetermined alternative channel to which access point 122 will switch prior to an actual catastrophic event, although the scope of the invention is not limited in this respect. Mobile unit 110 associated with access point 122 may perform background scanning of other channels for potential alternate access points. In addition, however, mobile unit 110 may check the indicated alternate channel, channel B, at a time encompassing the indicated beacon offset, $t_{oB}$, such that if access point 122 switches to the alternate channel, channel B, due to a catastrophic interferer, mobile unit 110 may readily detect the switch.

The messages in beacon frames broadcast by access point 122 in channel A indicating the alternate channel and an offset time of the beacons between channels is shown at 214. In the event of the appearance of a severe interferer on channel A as shown at 216, access point 122 may be unable to transmit a channel switch announcement due to the presence of the catastrophic interferer at 216. As a result, access point 122 may switch to the previously indicated, predetermined, alternate channel, channel B, and resume transmitting beacons in the alternate channel at the previously indicated offset time as shown at 218. Access point 122 may switch to the predetermined, alternate channel without making an announcement to mobile unit that the switch is occurring or has occurred. In one embodiment of the invention, the beacons transmitted by access point 122 in the new channel, channel B, may occur at a time equal to the time of the last clearly transmitted beacon in channel A, plus the offset time, $t_{oB}$ as shown in FIG. 2, although the scope of the invention is not limited in this respect. Upon switching to the new channel, in this example channel B, access point 122 may transmit beacons as shown at 212 with the same period at which the beacons in previous channel were transmitted, but at a target beacon transmission time (TBTT) which may have an offset from the TBTT of beacons in the previous channel by a time equal to the beacon offset time. In one embodiment of the invention, mobile unit 110 may periodically switch to the predetermined, alternate channel at the TBTT of the alternate channel until beacons transmitted from access point 122 are detected on the alternate channel, although the scope of the invention is not limited in this respect.

Mobile unit 110 may detect the beacon transmitted by access point 122 in the alternate channel, channel B, at 220 since access point 122 transmitted the alternate channel and the offset time in channel A beacons. In one embodiment of the invention, mobile unit 110 may continually background monitor the alternate channel at the predetermined time as indicated by the offset time during a specified time window to determine whether access point 122 has switched to the alternate channel. In the event mobile unit 110 detects that access point has in fact switched to the alternate channel by detecting a beacon transmitted from access point 122 in the alternate, predetermined channel such as shown at 218, mobile unit 110 may likewise switch to the alternate channel, channel B, as shown at 222 to continue to communicate with access point 122 and complete a transition to channel B, although the scope of the invention is not limited in this respect. In an alternative embodiment, access point may preemptively transmit multiple alternate channels and optionally multiple associated offset times for the multiple alternate channels to accommodate a situation in which there may be a catastrophic interferer on one alternate channel simultaneous with a catastrophic interferer on the original channel. Mobile unit 110 may check each alternate channel until a beacon transmitted by access point 122 is detected on an alternate channel, and may optionally do so in an order preannounced by access point 122, although the scope of the invention is not limited in this respect. In one such embodiment, the time offset from a first channel to a subsequent channel may be constant valued between the channels, and in a further embodiment, the TBTT offset times for the alternate channels may be ordered according to a predetermined order of alternate channels where the predetermined order may be based on, for example, the signal quality on the alternate channels, although the scope of the invention is not limited in this respect.

In one embodiment of the invention, the beacon offset time $t_{oB}$ may be chosen to be slightly shorter than one beacon interval. As a result, the maximum bounded time for a complete channel switch from channel A to channel B may be slightly greater than one beacon interval, for example on the order of 100 ms, although the scope of the invention is not limited in this respect. In a particular embodiment of the invention, such an arrangement may be sufficiently short that streaming media applications will be unaffected by the channel switch, showing no glitches or other user-perceptible artifacts due to data loss, and interactive services such as voice will not show any significant perceptual losses, although the scope of the invention is not limited in this respect. As a result, real time streaming or interactive applications may be unaffected or relatively unaffected in the face of sudden and severe interference, with no perceptible interruption to the user, although the scope of the invention is not limited in this respect.

Figure 3:
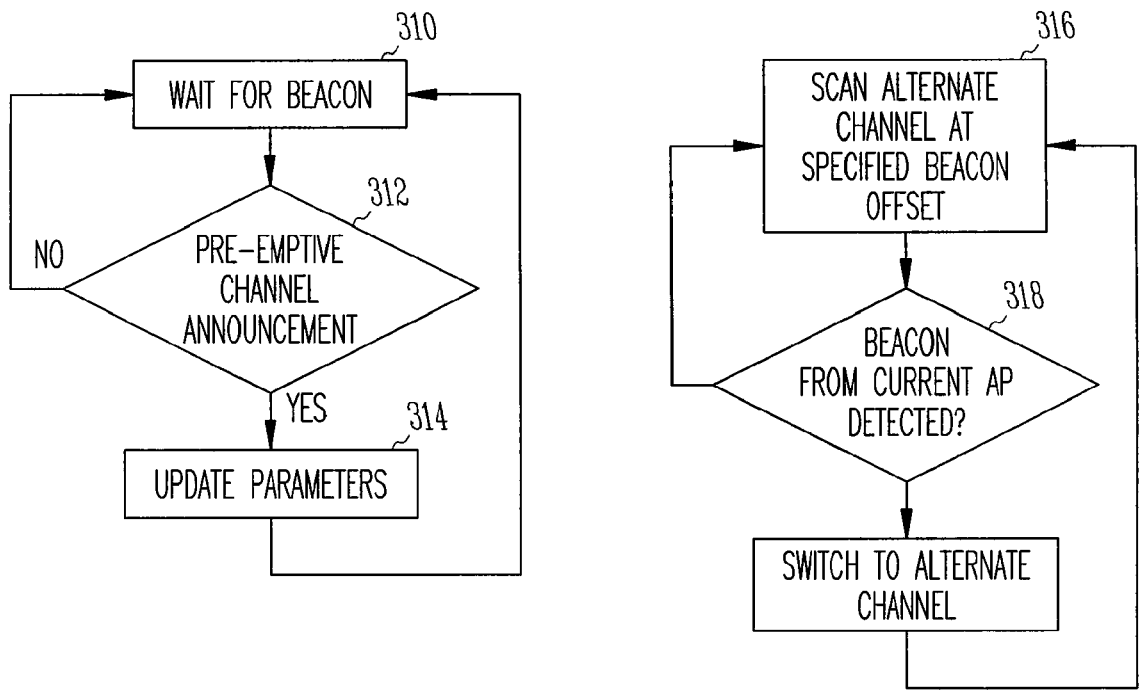
FIG. 3 is a flow diagram of a method for preemptive dynamic frequency selection in accordance with one embodiment of the present invention.

Referring now to FIG. 3, a flow diagram of a method for preemptive dynamic frequency selection in accordance with one embodiment of the invention will be discussed. As shown in FIG. 3, mobile unit 110 may wait for a beacon transmitted from access point 122 at block 310, and on receipt of a beacon, a determination may be made at block 312 whether the beacon contains a preemptive channel switch announcement message, which may include a predetermined, alternate channel and a beacon time offset. In the event the beacon contains a preemptive channel switch announcement message, mobile unit 110 may update stored parameters that indicated the predetermined, alternate channel and beacon offset time at block 314. In the event the beacon doses not contain a preemptive channel switch announcement message, the mobile unit may continue to wait for subsequent beacons at block 310. Mobile unit 110 may scan, optionally independently, the predetermined, alternate channel determined at block 312 at the specified time at block 316 as determined by the beacon offset time. A determination may be made at block 318 whether a beacon from the current access point 122 is detected in the predetermined alternate channel at a time determined by the beacon offset time. In the event mobile unit 110 detects a beacon from the currently associated access point 122 in the predetermined, alternate channel, mobile unit 110 performs a channel switch to communicate with access point 122 in the predetermined, alternate channel. After switching to the predetermined alternate channel, mobile unit 110 may continue at blocks 310 and 316, although the scope of the invention is not limited in this respect.

In one embodiment of the invention, wireless LAN communication system 100 implementing an audio, video, or other real time system such as a voice or videoconference system may be arranged such that a bounded maximum interrupt time cause by a severely interfered environment on the original channel, such as shown at 216, may be tolerated by including receiver side buffering without interruption of the real time data as perceived by a user. In a further embodiment, transmitter side buffering may likewise be tolerant to the bounded maximum interrupt time to avoid transmit buffer overflow. Such an audio, video, or other real time system may be arranged such that a bounded maximum interruption time cause by a severely interfered environment on the original channel, such as shown at 216, may be tolerated without a drop in communication. Furthermore, a perceptual mitigation scheme may be utilized such that in the event of severe interference, a temporary interruption of the transmission of data may result in little or no perceptual effects as experienced by a user, although the scope of the invention is not limited in this respect.

Figure 4:
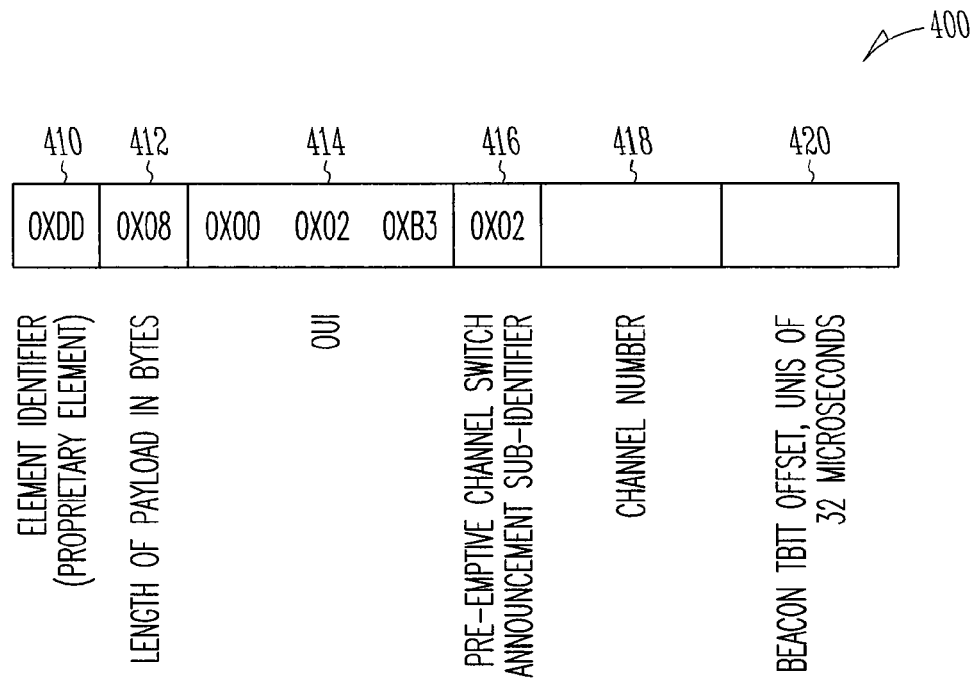
FIG. 4 is a diagram of a channel switch announcement message in accordance with an embodiment of the present invention.

Referring now to FIG. 4, a diagram of a channel switch announcement message in accordance with one embodiment of the invention will be discussed. As shown in FIG. 4, channel switch announcement message 400 may include an element identifier 410, an element 412 indicating the length of the payload in bytes, an organizationally unique identifier (OUI) 414, a preemptive channel switch announcement subidentifier 416, a channel number element 418 indicating a predetermined, alternate channel, and a beacon offset time element 420 which may indicate a beacon offset time, for example in units of 32 microseconds, although the scope of the invention is not limited in this respect. In one particular embodiment of the invention, channel switch announcement message 400 may be in the form of an information element as defined in the IEEE 802.11-1997 standard, although the scope of the invention is not limited in this respect. Such an information element may be uniquely identified as being a proprietary extended function, for example by using an organizationally unique identifier (OUI) assigned by the IEEE. Such a message may be included in beacon frames transmitted by access point 122, and may be interpreted by clients such as mobile unit 1100 that support the extended functionality in accordance with the present invention, and ignored by clients that do not, although the scope of the invention is not limited in this respect. In one particular embodiment, the invention may be implemented as an extension to any IEEE standards, for example the IEEE 802.11e standard or the IEEE 802.11h standard, although the scope of the invention is not limited in this respect.

Although the invention has been described with a certain degree of particularity, it should be recognized that elements thereof may be altered by persons skilled in the art without departing from the spirit and scope of the invention. It is believed that the preemptive dynamic frequency selection of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method comprising:
transmitting, on a first channel of a network communication system, indications of a plurality of alternate channels and an inter-channel offset time; and
in response to a subsequent interference event on the first channel, scanning the plurality of alternate channels that were indicated prior to the interference event in a prearranged order until a beacon is detected on an alternate channel and switching to that alternate channel, wherein the inter-channel offset time is a constant value between adjacent channels in the prearranged order.

2. The method of claim 1, further including arranging the alternate channels according to a signal quality of the alternate channels before transmitting the indications of the plurality of alternate channels.

3. The method of claim 1, wherein transmitting indications of the plurality of alternate channels includes transmitting a message including a preemptive channel switch announcement sub-identifier, at least one channel identifier indicating an alternate channel, and the inter-channel offset time.

4. The method of claim 1, wherein scanning the indicated alternate channels includes switching back and forth between the first channel and an alternate channel until a beacon is detected.

5. The method of claim 1, wherein scanning the indicated alternate channels includes scanning target beacon times of the alternate channels having the same transmit beacon time period as the first channel but offset by the inter-channel offset time.

6. The method of claim 1, wherein transmitting an inter-channel offset time includes transmitting an inter-channel offset time that is slightly less than one transmit beacon time period, and wherein switching to the alternate channel includes switching to the alternate channel within a maximum time that is slightly greater than the transmit beacon time period.

7. The method of claim 1, including buffering a sufficient amount of data at a transmitter to tolerate a maximum channel interrupt time without loss of data.

8. The method of claim 1, wherein transmitting on a first channel of a network communication system includes transmitting on a first channel of a network communication system included in at least one of an audio system, video system, or videoconference system.

9. An apparatus comprising:
a transceiver;
an antenna to couple to the transceiver; and
a processor, to communicatively couple to the transceiver, configured to:
receive, on a first channel of a network communication system, indications of a plurality of alternate channels and an inter-channel offset time; and
in response to a subsequent interference event on the first channel, scanning the plurality of alternate channels, that were indicated prior to the interference event, in a prearranged order until a beacon is detected on an alternate channel and switching to that alternate channel, wherein the inter-channel offset time is a constant value between adjacent channels in the prearranged order.

10. The apparatus of claim 9, wherein the processor is configured to:
scan the indicated alternate channels by switching back and forth between the first channel and indicated alternate channels until a beacon is detected; and
switch to the channel associated with the detected beacon.

11. The apparatus of claim 9, wherein the processor is configured to scan target beacon times of the plurality of alternate channels, wherein the target beacon times have the same transmit beacon time period as the first channel but offset by the inter-channel offset time.

12. An apparatus comprising:
a transceiver;
an antenna to couple to the transceiver; and
a processor, to communicatively couple to the transceiver, configured to:
transmit, on a first channel of a network communication system, indications of a plurality of alternate channels and an inter-channel offset time, wherein the inter-channel offset time is a constant value between adjacent channels; and
in response to a subsequent interference event detected on the first channel, switch to an alternate channel that was indicated prior to the interference event and transmit a beacon on the alternate channel at a target beacon time that is offset from a beacon time of the first channel by the inter-channel offset time.

13. The apparatus of claim 12, wherein the processor is further configured to order the alternate channels according to signal quality of the alternate channels prior to transmitting the indications of the plurality of alternate channels.

14. The apparatus of claim 12, wherein the processor is configured to transmit a message including a preemptive channel switch announcement sub-identifier, at least one channel identifier indicating an alternate channel, and the inter-channel offset time.

15. The apparatus of claim 12, wherein the inter-channel offset time is slightly less than one transmit beacon time period, and wherein the processor is configured to switch to the alternate channel within a maximum time that is slightly greater than the transmit beacon time period.

16. The apparatus of claim 12, including a transmit data buffer having sufficient storage to tolerate a maximum channel interrupt time without transmit buffer overflow.

17. The apparatus of claim 12, wherein the apparatus is included in at least one of an audio system, video system, or videoconference system.

18. An article, comprising:

a storage medium having stored thereon instructions that, when performed by a computing platform, result in pre-emptive dynamic frequency selection by:

transmitting, on a first channel of a network communication system, indications of a plurality of alternate channels and an inter-channel offset time; and in response to a subsequent interference event on the first channel, scanning the plurality of alternate channels that were indicated prior to the interference event in a prearranged order until a beacon is detected on an alternate channel and switching to that alternate channel, wherein the inter-channel offset time is a constant value between adjacent channels in the prearranged order.

19. The article of claim 18, wherein the storage medium includes instructions that when performed result in the computing platform arranging the alternate channels according to a signal quality of the alternate channels before transmitting the indications of the plurality of alternate channels.

20. The article of claim 18, wherein the storage medium includes instructions that when performed result in the computing platform scanning target beacon times of the alternate channels having the same transmit beacon time period as the first channel but offset by the inter-channel offset time.

\* \* \* \* \*